UNITED STATES PATENT OFFICE.

THOMAS HODGSON, OF BROOKLYN, ASSIGNOR TO ROBT. L. WRIGHT, OF NEW YORK, N. Y.

IM ROVEMENT IN THE MANUFACTURE OF ARTIFICIAL STONE.

Specification forming part of Letters Patent No. 13,116, dated June 19, 1855.

*To all whom it may concern:*

Be it known that I, THOMAS HODGSON, of the city of Brooklyn, in the county of Kings and State of New York, have invented a new and useful composition to be molded in a plastic state into blocks or ornamental forms to imitate hewn, dressed, carved, or sculptured stone; and I do hereby declare that the following is a full, clear, and exact description of the nature of my invention and its practical application.

The nature of my invention consists in the admixture, in the manner and in about the proportions hereinafter described, of sand or pulverized stone, plaster-of-paris, and blood, to form a plastic composition to be molded or cast into blocks of architectural ornaments, statuary, or other ornamental forms, and afterward hardened by exposure to the atmosphere, when it has the appearance and possesses the characteristics of stone.

The manner of preparing the several component parts, the necessary proportions of each, the manner of admixture, and subsequent treatment are as follows:

Take of any description of sand or pulverized stone ninety parts, by measure. If beach-sand, it will require to be washed in fresh water to deprive it of saline matter; but if other sand no preparation will be necessary further than sifting. If pulverized stone, the stone may be of any kind suitable for building purposes, and may be obtained by grinding the stone to a powder of a sufficient degree of fineness, and for this purpose such pieces as are useless for other purposes may be used. The degree of fineness of the stone or sand may vary according to the degree of fineness of the surface to be produced; but the sand or stone should be sifted to deprive it of lumps or large particles. Then take of plaster-of-paris thirty parts by the same measure. Mix the sand or pulverized stone and the plaster-of-paris well together upon a board or in a trough, and when well mixed add twenty-four parts, by the same measure, of beasts' blood, preferably in a clotted state, and with a trowel, spatula, or other suitable implement triturate and work the whole well together until the mass assumes the consistency of moist paste, when it will be ready for molding or casting.

The mold in which the composition is to be cast or molded may be of wax or sulphur, or other material generally used in molding or casting plaster figures or ornaments, and before receiving the composition requires to be prepared by first varnishing with shellac varnish, and then, immediately before the molding or casting is performed, coating it with sweet-oil. The composition in the state above last-described is dabbled into the mold with the fingers or with suitable tools with a tremulous motion, as by that motion the block or article will be produced more compact. The composition then requires to be left in the mold for fifteen or sixteen hours, more or less, when the cast can be removed. This being done, the newly-formed article should be left for a few days in a warm, dry atmosphere, when it will have the hardness required for practical purposes.

In large blocks or articles the center may be filled with pieces of broken stone or other hard durable substances, care being taken that the spaces between the said pieces be well filled with the composition.

The artificial stone thus produced is capable of withstanding greater tensional or crushing force than most kinds of stone used for building purposes, and will become harder by exposure to the atmosphere. Its color may be varied by the addition of coloring-matter to the composition. Its cheapness is scarcely necessary to be mentioned, as all the component parts are comparatively valueless, and no expensive preparation or manipulation is required.

The proportions of the various ingredients of the composition may be somewhat varied without materially affecting its character, though I have satisfied myself by carefully-conducted experiment that no departure from the above proportions can be made with advantage.

I do not claim the admixture of blood with sand or other earthy or mineral matter, except in the manner and for the purpose herein specified, as I am aware that such mixtures have been used for mortar, cement, stucco, &c.; but I do claim and desire to secure by Letters Patent—

The composition formed by the admixture of sand or pulverized stone, plaster-of-paris, and beasts' blood, when these ingredients are mixed in the manner and in about (without limiting myself precisely to) the proportions herein set forth, to be molded or cast while in a plastic state, substantially as herein described, into blocks, architectural ornaments or devices, statuary, or ornamental or other forms or figures, and in such conditions used as a substitute for stone for building, architectural or other ornamental purposes.

THOMAS HODGSON.

Witnesses:
S. H. WALES,
J. W. COOMBS.